US012411948B2

(12) United States Patent
Betser

(10) Patent No.: US 12,411,948 B2
(45) Date of Patent: *Sep. 9, 2025

(54) CLUSTERING AND CLUSTER TRACKING OF CATEGORICAL DATA

(71) Applicant: Microsoft Technology Licensing, LLC, Redmond, WA (US)

(72) Inventor: Michael A. Betser, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/414,994

(22) Filed: Jan. 17, 2024

(65) Prior Publication Data

US 2024/0193269 A1     Jun. 13, 2024

Related U.S. Application Data

(63) Continuation of application No. 16/917,589, filed on Jun. 30, 2020, now Pat. No. 11,914,705.

(51) Int. Cl.
| | |
|---|---|
| *G06F 21/00* | (2013.01) |
| *G06F 16/28* | (2019.01) |
| *G06F 21/55* | (2013.01) |
| *G06F 21/56* | (2013.01) |

(52) U.S. Cl.
CPC .......... *G06F 21/554* (2013.01); *G06F 16/285* (2019.01); *G06F 21/56* (2013.01); *G06F 2221/034* (2013.01)

(58) Field of Classification Search
CPC ...... G06F 16/285; G06F 16/353; G06F 21/56; G06F 21/554; G06F 2221/034; G06N 20/10; H04L 63/1425; H04L 63/1483; H04L 63/0245
See application file for complete search history.

(56) References Cited

U.S. PATENT DOCUMENTS

| | | | |
|---|---|---|---|
| 2017/0091471 A1* | 3/2017 | Su | .......... G06F 16/287 |
| 2021/0019556 A1* | 1/2021 | Ganguly | .......... G06F 18/24137 |

FOREIGN PATENT DOCUMENTS

| | | | | |
|---|---|---|---|---|
| CA | 2504680 C | * | 4/2014 | ............. G06F 21/10 |

* cited by examiner

*Primary Examiner* — Tri M Tran
(74) *Attorney, Agent, or Firm* — Schwegman Lundberg & Woessner, P.A.

(57) ABSTRACT

An approach for clustering large sets of categorical data involves iteratively ordering the data points, partitioning the data into blocks based on the ordering, and clustering the data points within each block, where different iterations use different orderings and, thus, different partitionings. In some embodiments, the data points are represented by multi-dimensional categorical vectors, and the orderings are based on permutations of the categorical dimensions. The iterative clustering may be repeated for multiple successive time windows to track the clusters. Various applications of the disclosed clustering approach, including for cyber security, are also described.

20 Claims, 5 Drawing Sheets

CLUSTERING AND CLUSTER TRACKING OF CATEGORICAL DATA

PRIORITY

This application is a continuation of U.S. patent application Ser. No. 16/917,589, filed Jun. 30, 2020, which is incorporated by reference here in its entirety.

BACKGROUND

Large computer systems, such as enterprise networks, usually employ software tools for protecting against a variety of cyber threats like unauthorized access, data theft, and malware. Enterprise-scale email (or other electronic messaging) systems, for example, may screen and filter incoming emails to identify potential phishing attempts, emails with malware attachments (such as computer viruses, worms, spyware, etc.), or—at a lower level of severity— spam or other unwanted communications. A security administrator may review the identified emails to determine, based on an assessment of the threat level, which further action to take, such as whether to delete, quarantine, or release an email, block the sender, alert the targeted recipient, and so on. Alternatively, further processing of the identified threats may be performed automatically, for example, by artificial-intelligence (AI) software. With a large volume of emails, the review process can consume substantial human or computational resources, entailing a security risk presented by inaccurate threat classification. Approaches to making the screening and filtering of large email or other data streams more efficient are, therefore, desirable.

DETAILED DESCRIPTION

Figure 1:
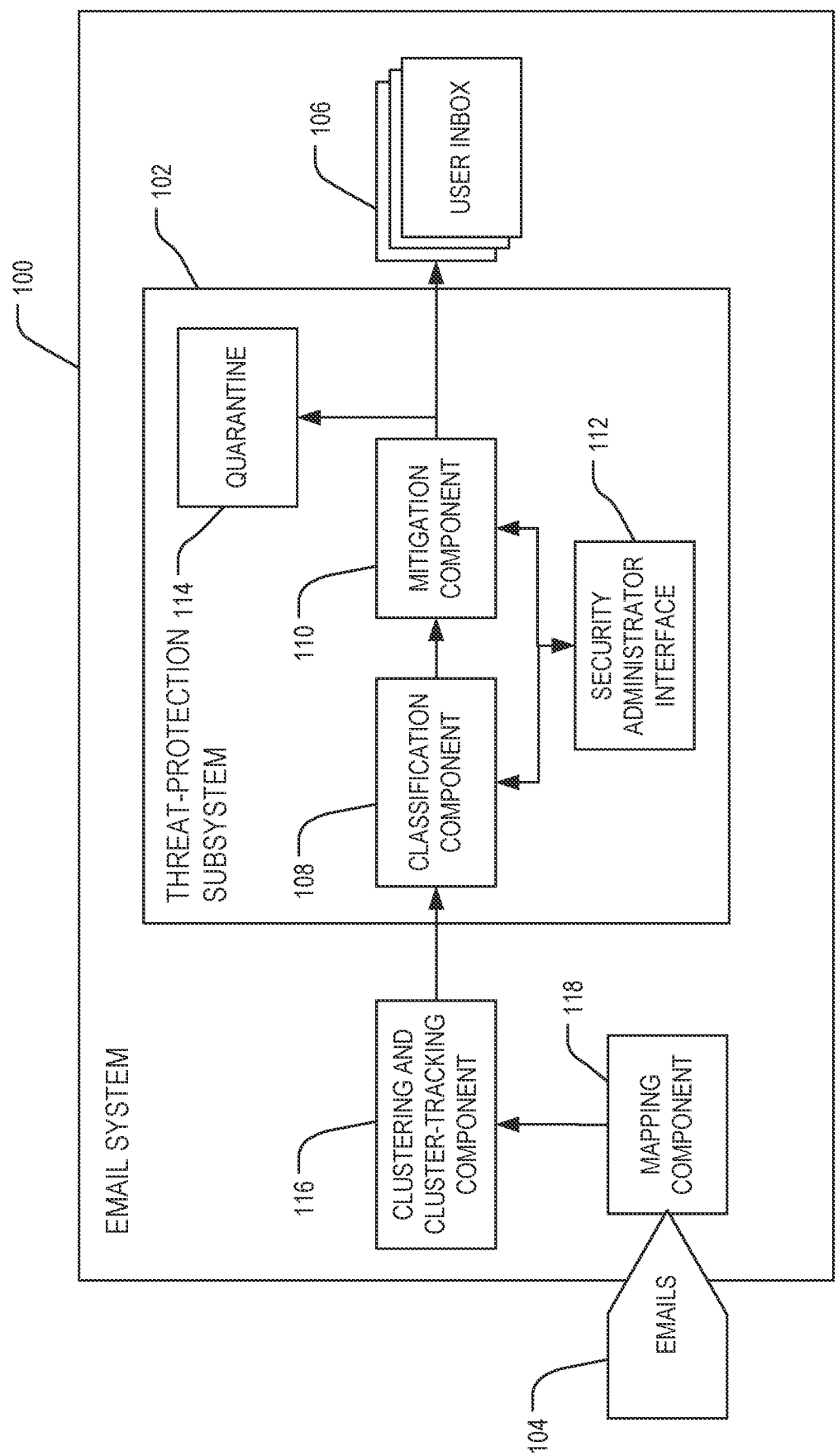
FIG. 1 is a block diagram of an example enterprise email system with threat protection functionality that utilizes data clustering in accordance with one or more embodiments.

This disclosure relates generally to clustering processes, especially for clustering categorical data as well as for tracking the clusters over time to incrementally process an ongoing stream of data. In the cyber security context, these processes may be used, for example, to group large numbers of incoming emails or other text-based electronic messages (such as, e.g., instant messages or Short Message Service (SMS) messages) based on textual similarity, making the manual review or automatic classification of suspicious messages more manageable. While described primarily with reference to message clustering, the disclosed clustering processes are more generally applicable or adaptable to the clustering of any kind of categorical data, and are especially beneficial to process large amounts of temporally evolving data. Areas where the clustering processes may be used advantageously include, for instance, the clustering of images to track copyright infringement on the Internet, the grouping of related documents in an enterprise for purposes of applying retention or confidentiality policies and the like, the organization of large volumes of documents around topics for improved information retrieval, or the grouping of customers for customer relationship management, to name just a few. In all of these applications, the clustering results may be provided as input to some subsequent action, for instance: clustered messages may be classified by thread level, potentially triggering some threat-mitigating action (deletion, quarantine, etc.); images on the Internet that are clustered with copyrighted images may trigger an enforcement action such as sending of take-down notices or legal action; clusters of related documents may have a uniform document policy applied; topic-based clusters may be stored in association with the topic and used in search to provide more relevant results; and groups of customers may be assigned to respective customer relationship managers.

In various embodiments, to facilitate the efficient clustering of large datasets, the data is first partitioned into a plurality of subsets, hereinafter "blocks," and full clustering is performed within each of the blocks. Beneficially, such partitioning facilitates parallel data processing, and thus increases the efficiency of the clustering process. Increased efficiency, in turn, allows larger datasets to be processed and/or higher accuracies to be achieved, or, for a given amount of data and given accuracy, reduces the time until clustering is complete. The partitioning is based on some ordering of the data that is designed to ensure that the data points within each block have some degree of similarity at the outset. For example, each data point may be mapped onto a multi-dimensional categorical vector, where each vector element may be represented, for instance, by one of a fixed number of integers (e.g., the digits from 0-9) corresponding to the number of categorical dimensions, and the vectors may be sorted numerically. (Note that the term "vector," as used herein, simply refers to an ordered set of vector elements, not necessarily to a point in a vector space in the strict mathematical sense.) Following clustering within each block, the clustered data of all blocks is reshuffled (e.g., based on some permutation of the dimensions in the multi-dimensional categorical vector), repartitioned into new blocks, and clustered further within the new blocks, whereby previously created clusters can grow by the addition of new data points or cluster mergers. The process is repeated iteratively, e.g., for a fixed number of iterations or until some convergence criterion is reached. In practice, good clustering is achieved, in some applications, within relatively few (e.g., five) iterations.

In some embodiments, for the sake of computational tractability, the clusters are defined to have a simple shape, such as that of a hypersphere with fixed radius shared among all clusters, which contributes to clustering efficiency. If, during the iterative clustering process, the cluster center of one previously created cluster falls inside the hypersphere of another, second cluster, the first cluster may be assigned to the second cluster, with all data points within the first cluster that fall outside the hypersphere of the second being added back into the dataset as singletons (a singleton being a cluster of size 1, that is, an individual data point of the original dataset, rather than a data point representing a cluster of multiple such individual original data points).

In various embodiments, temporally evolving data is clustered in a low-cost manner by repeating the iterative clustering process periodically to update the clusters based on new data points. More specifically, to compute clusters for a given time window, the above-described clustering process can be performed on a dataset initialized with the new data points received during that time window and the clusters that were generated for the immediately preceding time window. To avoid the number of clusters from growing indefinitely over time, the time when each cluster was last updated may be recorded, and clusters may be deemed "expired" and dropped from the dataset if their last update precedes a specified rolling-window time period.

Although designed specifically to address challenges encountered with categorical data, such as the lack of a Euclidian property as is relied upon by many conventional partitioning methods, the described processes can in principle also be applied to real-valued data, allowing their use on a broad range of data types and in many different scenarios. Application of the described approach to large amounts of categorical data, and especially temporally evolving data, is particularly beneficial, as existing clustering approaches are often not suitable for such data.

Various example embodiments will now be described with reference to the accompanying drawings.

FIG. 1 is a block diagram of an example enterprise email system 100 (as an example of an electronic messaging system) with threat protection functionality that utilizes data clustering in accordance with one or more embodiments. The system 100 includes a threat-protection sub-system 102 through which all incoming email 104 is channeled before it reaches the users' inboxes 106. This threat-protection sub-system 102 may include a classification component 108 that determines whether an email poses a security threat, and a mitigation component 110 that takes appropriate action based on the determination. Further, the threat-protection sub-system 102 may include a security administrator interface 112 in communication with the classification component 108 and/or the mitigation component, which may allow a security administrator to manually make classification decisions, review and alter automated classifications, and/or direct specific mitigating actions.

Email classification may be binary, distinguishing, for example, between safe and malicious emails, or between safe and suspicious emails. Emails determined to be safe will generally be forwarded to the designated recipient's inbox 106. Malicious emails may be automatically deleted by the mitigation component 110, and may optionally trigger further action, such as blocking the sender's address. Suspicious email may be placed into quarantine 114 pending further review, e.g., by the intended recipient or a security administrator. In some embodiments, email classification is non-binary, that is, the classification component 108 assigns security threat levels selected among three or more levels to the emails. Emails may, for instance, be classified as good, malicious, or benign spam, the latter class including emails that, although not posing a security threat, tend to be undesired communications (such as broadcast, poorly targeted attempts to solicit business). The mitigation component 110 may, for example, delete malicious email, but send spam either to the user's spam filter, or to quarantine 114, from which the email mail be released if the user so chooses.

In accordance with various embodiments, to facilitate processing a high volume of emails (e.g., in the millions or, for very large enterprises, even reaching billions per day), the threat-protection sub-system 102 utilizes a clustering and cluster-tracking component 116 that groups emails based on similarity of their text, allowing the email classification to be performed on the clusters in their entirety. The clustering and cluster-tracking component 116 may be preceded by a mapping component 118 that generates, from the incoming emails 104, data representations suitable for clustering. For example, as explained in more detail below with reference to FIG. 3, each email may be converted into a multi-dimensional categorical vector. Optionally, in some embodiments, the mapping implemented by the mapping component 118 assigns identical multi-dimensional vectors to emails that vary only minimally, thereby already achieving some level of clustering before the multi-dimensional categorical vectors are provided as input to the clustering and cluster tracking component 116.

Clustering may be performed for a fixed set of emails received at the system 100 over a certain time window, e.g., an hour or a day. To achieve clustering over longer time spans without having to repeat the process again and again on the growing accumulated data, the clustering and cluster tracking component 116 may initialize the dataset for each time window based on the clusters formed during the preceding time window, sorting new emails into existing clusters and/or forming new clusters or merging clusters as appropriate to capture the evolving dataset. In this manner, clusters may be continuously updated at low computational cost. A cluster may expire if no new emails are added to it for a specified period of time (e.g., spanning multiple time windows), keeping the overall set of clusters manageable over time.

Clustering and cluster tracking may increase not only efficiency, but potentially also classification accuracy. For instance, if many users across the enterprise receive essentially the same message (although addressed to each user individually), this may be an indication of a possible cyber-attack or spam. Clustering may also help thwart an attack that initially went undetected. For instance, if a user reports a phishing attempt, and the email in question turns out to be part of a larger cluster, the mitigation component 110, or the system administrator via the security administrator interface 112, may send a warning about the malicious content of the email to other recipients, and/or, as a precaution, ask users to reset their passwords or other access credentials. Similarly, if a user notices a suspicious attachment which turns out to be malware, the mitigation component 110 or system administrator may send an email to users that have received similar emails, as determined based on the clustering, asking the users to delete those emails without opening the attachment, and/or launch a security scan to determine whether the system 100 or any part thereof has already been infected by malware. Clustering may also serve to provide better training data for any machine learning models employed, e.g., for classification or mitigation in components 108, 110.

The system 100 can be implemented by a suitable combination of hardware and/or software, such as with one or more computers (e.g., as described with reference to FIG. 5) including general-purposes computer processors (e.g., central processing units (CPUs)) and memory storing data and software instructions, optionally enhanced by hardware accelerators, such as application-specific integrated circuits (ASICs), field-programmable gate arrays (FPGAs), digital signal processors (DSPs), or other special-purpose processors. For example, clustering and/or classification processes employed by the clustering and cluster-tracking component 116 and the classification component 108 may benefit from implementation with dedicated hardware accelerators, whereas user-facing components, such as the security administrator interface 112 and email inboxes 106 may use general-purpose processors. For large enterprises, the email system 100 typically operates on a server farm including multiple (e.g., tens or hundreds of) computers connected to each other via a suitable wired or wireless network (e.g., an intranet running on a local area network) and/or to the outside world, e.g., via the Internet.

Figure 2:
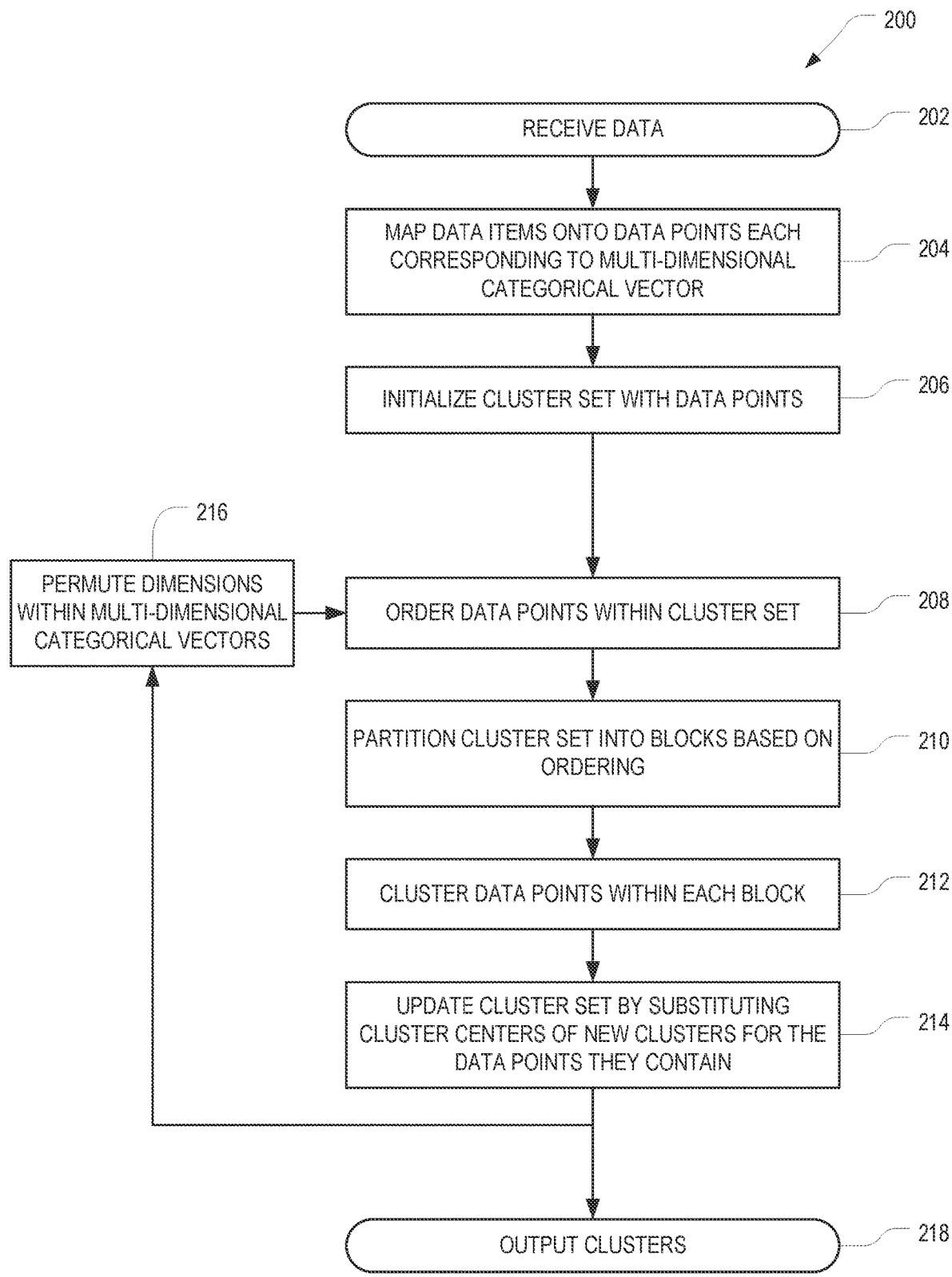
FIG. 2 is a flowchart of an example clustering method in accordance with one or more embodiments.

FIG. 2 is a flowchart of an example clustering method 200 in accordance with one or more embodiments. When used, in a non-limiting example application, to cluster emails, the method 200 may be implemented, e.g., by the mapping component 118 and the cluster and cluster-tracking component 116 of the email system 100 shown in FIG. 1. The method begins, in operation 202, with the receipt of the "raw" data (such as, e.g., emails). The individual raw data items (e.g., individual emails) may be mapped, in operation 204 (e.g., by the mapping component 118), onto multi-dimensional categorical vectors representing the data points to be clustered. Alternatively to multi-dimensional categorical vectors (which are understood to be of a fixed length), non-fixed-length multi-dimensional representations, such as sets or sequences of categorical values, may also be used. The elements of the multi-dimensional representation may be numbers (e.g., integers), letters, entire words, or generally any other values that are categorical in nature. In fact, if fixed-length representations are not desired, the mapping step may be omitted, and the raw data itself may be used as the representation that flows into the subsequent clustering. If mapping is used, it may be, but need not necessarily be, bijective. That is, while each data item is mapped onto a unique data point represented by a corresponding multi-dimensional categorical vector (or other multi-dimensional categorical representation), a given multi-dimensional categorical vector (or other representation) representing a given data point need not necessarily correspond to a single data item. Rather, as indicated above with reference to FIG. 1, in some embodiments, multiple data items, if sufficiently similar to one another, may be mapped onto the same multi-dimensional categorical vector (or other representation). Methods for accomplishing the mapping of operation 204 are discussed further below with reference to FIG. 3.

Irrespective of the particular type of input data received in operation 202 and the particular mapping function employed in operation 204, the output of that mapping operation 204 is a dataset $\{S\}$ that includes, for each data point, a multi-dimensional categorical representation $X=\{X_1, \ldots, X_N\}$, with elements $X_i \in \{K\}$, where $\{K\}$ is the set of possible categorical values, and N is the dimensionality of the representation. In various embodiments, as mentioned above, all data points in $\{S\}$ share the same dimensionality, i.e., N is fixed across all X; such representations are herein referred to as vectors. However, embodiments where the representations are not of fixed length are also conceivable. The categorical values in $\{K\}$ may be represented as integers expressed, for instance, as decimal, hexadecimal, or binary numbers. For example, for K=4 different categorical values, each element $x_i$ may be a two-digit binary (00, 01, 10, or 11) or, in decimal/hexadecimal notation, a digit between 0 and 3. Similarly, for K=16 different categorical values, each element $X_i$ may be a four-digit binary or, in hexadecimal notation, a digit between 0 and F, and so on. (Note that the number of categories need, of course, not be a power of two, although powers of two are convenient for binary or hexadecimal representation as commonly used in computing.) The dataset $\{S\}$ forms a metric space with metric M, which defines a pairwise distance between data points.

Clustering in method 200 is performed by iteratively updating a set of clusters $\{C\}$, where each cluster has two properties: a cluster center C represented, like the data points in $\{S\}$, by a multi-dimensional categorical vector of the same dimensionality N as the data points in $\{S\}$ (or some other multi-dimensional categorical representation, as applicable), and a list of data points X associated with the cluster.

In various embodiments, the clusters are modeled as N-dimensional hyperspheres characterized by a radius R, such that, for all data points X in cluster C, M(C,X)<R; the radius R may be shared among all clusters. The assumption of such a simple cluster shape renders the clustering problem more tractable and, as such, helps achieve the large scale needed to tackle many real-word problems. In addition, the simple hyperspherical shape provides for a straightforward way to classify new data points as belonging to an existing cluster based on a simple distance computation; for an arbitrary cluster shape, the classification would involve far more complex operations.

The cluster set $\{C\}$ is initialized, in operation 206, with all data points in $\{S\}$, which serve as the initial cluster centers of singleton clusters, the associated lists including only those respective cluster centers. The data points within the cluster set $\{C\}$ are then ordered in operation 208, and, based on the ordering, the cluster set $\{C\}$ is partitioned into fixed-size blocks in operation 210. For example, the data points may be ordered numerically based on the multi-dimensional categorical vectors representing them (more precisely, based on concatenations of the vector elements of those vectors), such that, e.g., the data point represented by categorical vector $\{1, 2, 1, 0 \ldots\}$ would appear before the data point represented by vector $\{1, 3, 0, 1, \ldots\}$, which, in turn, would appear before the data point represented by vector $\{2, 0, 3, 1, \ldots\}$. As another example, for data representations using letters or words, the ordering can be alphabetic. Given any such ordering, for a block size Q, the first Q data points will be assigned to block 1, the second Q data points will be assigned to block 2, and so on, until all data points have been placed in one of the blocks (Note that the last block may be smaller than Q, as the number of data points N is generally not a multiple of the block size Q.)

Following the partitioning (operation 210), a program implementing any of a number of suitable clustering processes operates on each block of data points, in operation 212, to cluster the data points within the block. Note that, as a result of the ordering-based partitioning scheme, data points within the same block likely have at least some overlap (e.g., in the first or first few vector elements), increasing the likelihood that they will end up in a cluster. The partitioning allows processing the data blocks in parallel, using multiple instances of the same program, to reduce clustering time. Since the clustering time scales quadratically with the number of data points within a cluster, the reduction in clustering time can be significant, e.g., orders of magnitudes, for large numbers of data blocks. Various suitable conventional clustering processes that can be used for clustering within each block are known to those of ordinary skill in the art; non-limiting example processes include DB-scan methods (which work well with categorical data) or hierarchical clustering methods.

In general, the clustering is based on the mutual distances between data points as defined by the applicable metric M, and tends to group data points that are closer together. In fixed-length vector embodiments, the metric may be the Hamming distance, that is, the number of positions at which the vectors differ. For example, the Hamming distance between two eight-dimensional vectors $\{1, 2, 1, 0, 3, 2, 1, 3\}$ and $\{1, 2, 0, 0, 3, 1, 1, 3\}$ is two. For multi-dimensional categorical representations that can differ in length, a set-based or sequence-based metric such as, e.g., the Damerau-Levenshtein distance (a string metric measuring the edit distance between to sequences, such as the minimum number of single-character operations needed to change one word into another), Jaccard index (a measure of the dissimilarity between two sets of samples, defined as the difference between the union and the intersection of the two sets, normalized by the union), or dynamic time warping (an way of measuring similarity between two temporal sequences) may instead be used.

After a block of data points has been fully clustered, each cluster C formed contains all data points within the block whose distances from the cluster center are smaller than the cluster radius R. In embodiments where the cluster radius R is shared among all clusters, as discussed above, the radius R may be fixed at the outset and flow as an input parameter into the clustering process. The cluster center of each cluster coincides, in various embodiments, with one of the data points within the cluster. In principle, however, it is also possible to compute a cluster center potentially different from each of the data points within the cluster. (For example, for each categorical dimension, the categorical value of the cluster center may be the value that occurs most often in the data points within the cluster for that dimension) After completion of clustering within the blocks, the cluster set {C} is updated, in operation 214, by replacing the individual data points within each of the newly formed clusters by the respective cluster center. That is, the individual data points that belong to each cluster are stored separately in the associated lists, but are removed from the cluster set {C}. The updated cluster set {C}, thus, contains fewer singleton clusters and more non-singleton clusters, and overall fewer data points, than the initial cluster set {C}.

To further cluster the data points in the updated cluster set {C}, the clustering process is repeated, but with data points reshuffled and partitioned into new blocks. In some embodiments, to facilitate a new ordering of the data points, some permutation of the dimensions of the multi-dimensional categorical vectors (or other representations) is applied to all data points within the cluster set in operation 216. This permutation, may effect, for instance, that the first elements in the multi-dimensional categorical vectors resulting from the permutation differ from the first elements in the respective original vectors. (Note that each data point generally remains uniquely represented by the original multi-dimensional categorical vector X, and that the new vector X' resulting from the permutation of elements can be derived from the original vector X via the known permutation $\pi$, i.e., $X'=\pi(\{X_1, \ldots, X_N\})$.) For multi-dimensional representations whose elements are numbers, the data points can then be reordered numerically based on the permuted dimensions (or, more precisely, based on concatenations of the permuted vector elements of the multi-dimensional categorical vectors) in operation 208. Similarly, for representations whose elements are characters or words, the data points can be reordered alphabetically. The updated cluster set {C} can be repartitioned based on the new ordering in operation 210. Various alternative reordering schemes may occur to those of ordinary skill in the art. For example, the permutations need not be random. Instead, the character distributions within each dimension across data points may be used to drive the ordering scheme, e.g., with a goal towards grouping data points that are more likely to be clustered together in the same block. Regardless of the reordering scheme employed, in the repartitioned dataset, data points that previously landed in the same block may now generally be assigned to different blocks, and, conversely, data points previously assigned to different blocks may now find themselves in the same block, allowing them to be clustered if sufficiently similar.

In the second and subsequent iteration, the data points input to the clustering process already include some clusters, and clustering in operation 212 may, accordingly, involve merging an existing cluster with one or more singletons or with other clusters. In general, the resulting merged cluster may have a new cluster center. In some embodiments, however, cluster centers are maintained throughout the iterative process for the sake of speed and simplicity. In this case, clustering may involve growing existing clusters by adding all singleton data points that fall within their respective cluster radius. Further, as between two clusters whose cluster centers are at a distance less than the cluster radius, the smaller of the two (i.e., the cluster containing fewer singletons) may be added to the larger one. Alternatively, as described below with reference to FIG. 4, the clustering may be repeated over multiple time windows, and the time any cluster was created may be tracked. In this case, older clusters may be given priority; that is, in case of a cluster merger, the oldest among the clusters may retain its center, and the data points within the newer cluster are simply added to the older one (by adding them to the list of data points contained in the older cluster). To the extent that any data points within the added cluster fall outside the radius of the merged cluster, they may be added back into the cluster set {C} as singletons.

The clustering process involving reordering (operation 208), e.g., based permutations of dimensions (operation 216), repartitioning (operation 210), clustering (operation 212), and updating of the cluster set {C} (operation 214) may be repeated until some convergence criterion has been met (e.g., until some measure of changes to the cluster set falls below a certain threshold, indicating that clustering has progressed sufficiently and further iterations would be unlikely to have any significant effect), or for a fixed number of iterations (e.g., determined empirically to result in satisfactory clustering). In practice, it has been found that, for datasets that are sparse in clusters, with a lot of data falling into singletons and the rest forming dense non-singleton clusters, a small number of iterations, e.g., five iterations, often suffices to obtain good clustering. Once the iterative clustering loop has been exited, the clusters are provided as output, in operation 218, to subsequent processing steps. For instance, in the case of email clustering, as described with reference to FIG. 1, the clusters may be automatically classified or provided to a security administrator for review and classification, followed by some mitigating action based on threat level. Other types of automated actions (optionally in conjunction with human action) may be taken, depending on the particular application.

Figure 3:
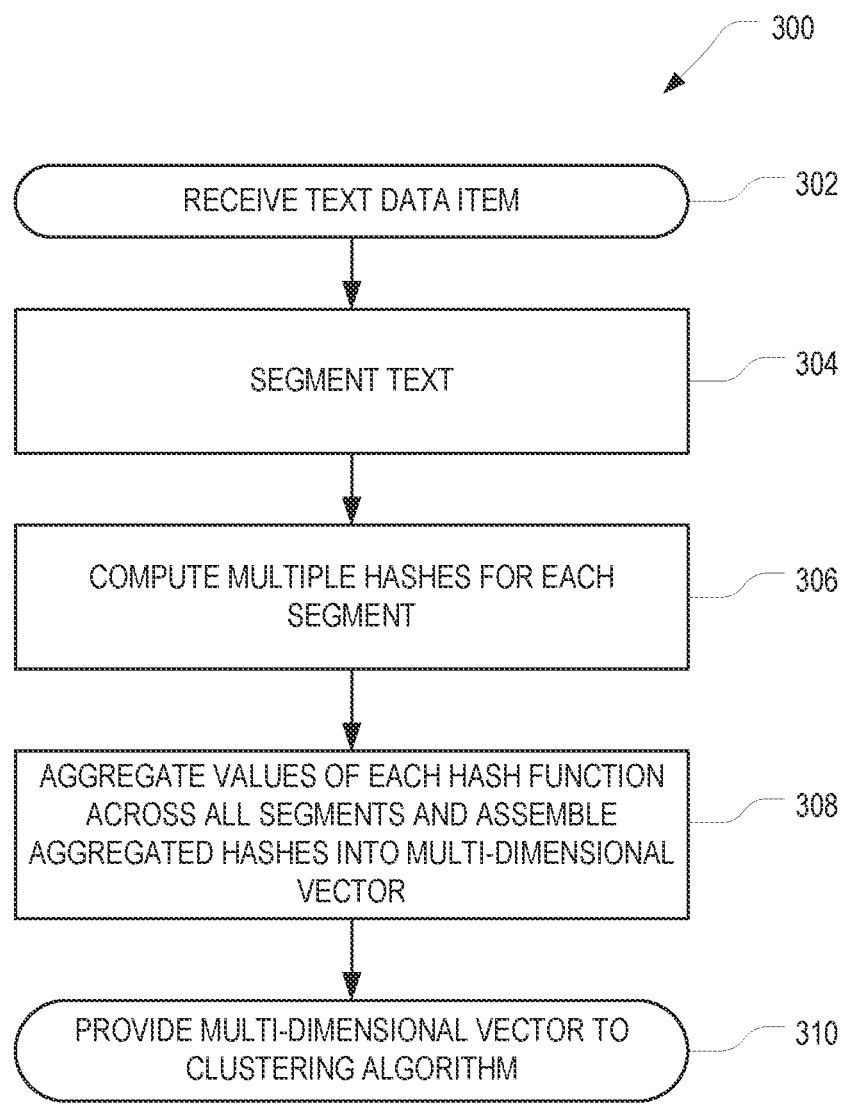
FIG. 3 is a flowchart of an example method for mapping data items onto multidimensional categorical vectors, in accordance with various embodiments.

FIG. 3 is a flowchart of an example method 300 for mapping data items onto multi-dimensional categorical vectors, in accordance with various embodiments Specifically, the method 300 applies to text data, such as, but not limited to, emails, and it produces multi-dimensional categorical vectors of a fixed length. The method 300 involves, upon receipt of a text data item in operation 302, dissecting the text into (disjunct or overlapping) segments in operation 304. The segments may be, for example, grammatical units such as sentences or words, or character sequences of a fixed length, such as trigrams including three consecutive characters. In operation 306, a fixed set of hash functions, equal in number to the dimensions of the multi-dimensional vectors to be generated, is applied to each of the segments, resulting, for N hash functions and M segments, in N×M hashes. In operation 308, the hashes are then aggregated, in some manner, across the segments, resulting in N values for the N hash functions. For example, for each dimension (i.e., each of the N hash functions), the minimum across all M values for the M segments may be selected, and taken modulo K to obtain one of K categorical values. Alternatively, the hashes for a given dimension may be added up over the M segments, and the sum may be taken modulo K to obtain one of K categorical values. Yet another way of aggregating values is to map the bashes onto categorical values for the individual segments M (that is, perform the modulo operation first), and then select, for each dimension, the categorical value that occurs most often across the M segments. The N aggregate values can then be assembled into the multi-dimensional categorical vector for the data item. In operation 310, the multi-dimensional vector is provided as input to the clustering process (beginning at operation 206 in method 200).

In some embodiments, the multi-dimensional categorical representations input to the clustering process are not fixed in length, that is, do not all share the same dimensionality. Text data items may, for example, be represented by segmenting the text (as in operation 304 of method 300), hashing each segment (as in operation 306), and then assembling the computed hash values (e.g., following a modulo operation or other manner of mapping them onto a fixed number of categorical values) into a multi-dimensional categorical representation. The segments may, again, be, e.g., sentences or fixed-length character sequences. Since different text documents (e.g., emails) generally vary in length, e.g., in the number of sentences and characters, the number of segments and, thus, the number of hash values will also vary. Distances between two data points having different lengths can be computed, as previously mentioned, e.g., using the Damerau-Levenshtein distance, Jaccard index, or dynamic time warping. To create different orderings of a set of data points represented by vectors of different lengths, the permutations of elements may, for example, be limited to the first n elements, where n is the minimum number of elements across all data points, or applied to vectors padded with zeros to a common length.

Clustering of text documents is, of course, not limited to emails. Another application within a large enterprise setting, to provide a further example, is the grouping of copies of documents that may have been slightly edited, e.g., having been renamed or cropped, or constituting different versions of a document. The purpose of such grouping may be to apply relevant policy settings (e.g, retention settings, confidentiality settings, etc.). The clustering may operate on the totality of documents in the enterprise to form the groups, and a policy component may then determine which policy to apply to each group and how to apply it. Alternatively, the policy may at the outset be applied to a predefined set of documents, e.g., final legal or financial documents, and those documents may be used to seed the cluster set (meaning that the cluster set is initiated with data points representing these documents). Documents similar to any document from the predefined set will then be clustered with the respective seed document, and have the same general policy applied.

As will be appreciated, the described clustering approach is, further, not limited to text data. Another range of applications is, for instance, image processing in a large-scale setting. For example, it may be desirable to track a large group of copyrighted images on the web for the purpose of copyright enforcement. The images may have been slightly edited via cropping, compression, noise reduction, etc. before publication on the web page, resulting in different image data, but with a very similar template and image appearance. A web crawler may extract a large set of images from the web. To identify, among this large extracted set, images similar to any of a given set of copyrighted images to be tracked, the clustering process is seeded with (i.e., the cluster set is initiated to) these copyrighted images, and modified to only grow existing clusters, without forming any new clusters. Clustering on the extracted set of images then operates to form clusters around each copyrighted image, while all extracted images that bear no similarity to one of the copyrighted images remain singletons. In image clustering, a robust bash to form the multi-dimensional categorical vectors extracted from the image may utilize, for instance, the PhotoDNA software developed by Microsoft, Redmond, WA. Following image clustering, the web postings of images within the clusters around the copyrighted images may be reviewed to determine whether they constitute copyright infringement, and some copyright enforcement action may be taken in response to detection of infringement. Such enforcement action may include, e.g., an automatically sent take-down notice, or referral to a lawyer for taking legal action.

So far, clustering has been described for a fixed dataset. As the example applications suggest, however, data sets of interest often evolve over time. For example, threat protection for emails or other electronic messages generally operates continuously on an incoming stream of emails, and, frequently, new malicious emails are repeat cyberattacks with very similar message content as previous messages. It is therefore desirable to continuously sort new emails into previously generated clusters, as well as discover new clusters as they emerge. Similarly, in the copyright application, it is desirable for the web crawler to continuously retrieve new images, which should be integrated with the existing clusters. In various embodiments, therefore, the clustering process is adapted to form and update clusters over time to incorporate new data as such data is generated or becomes available.

Figure 4:
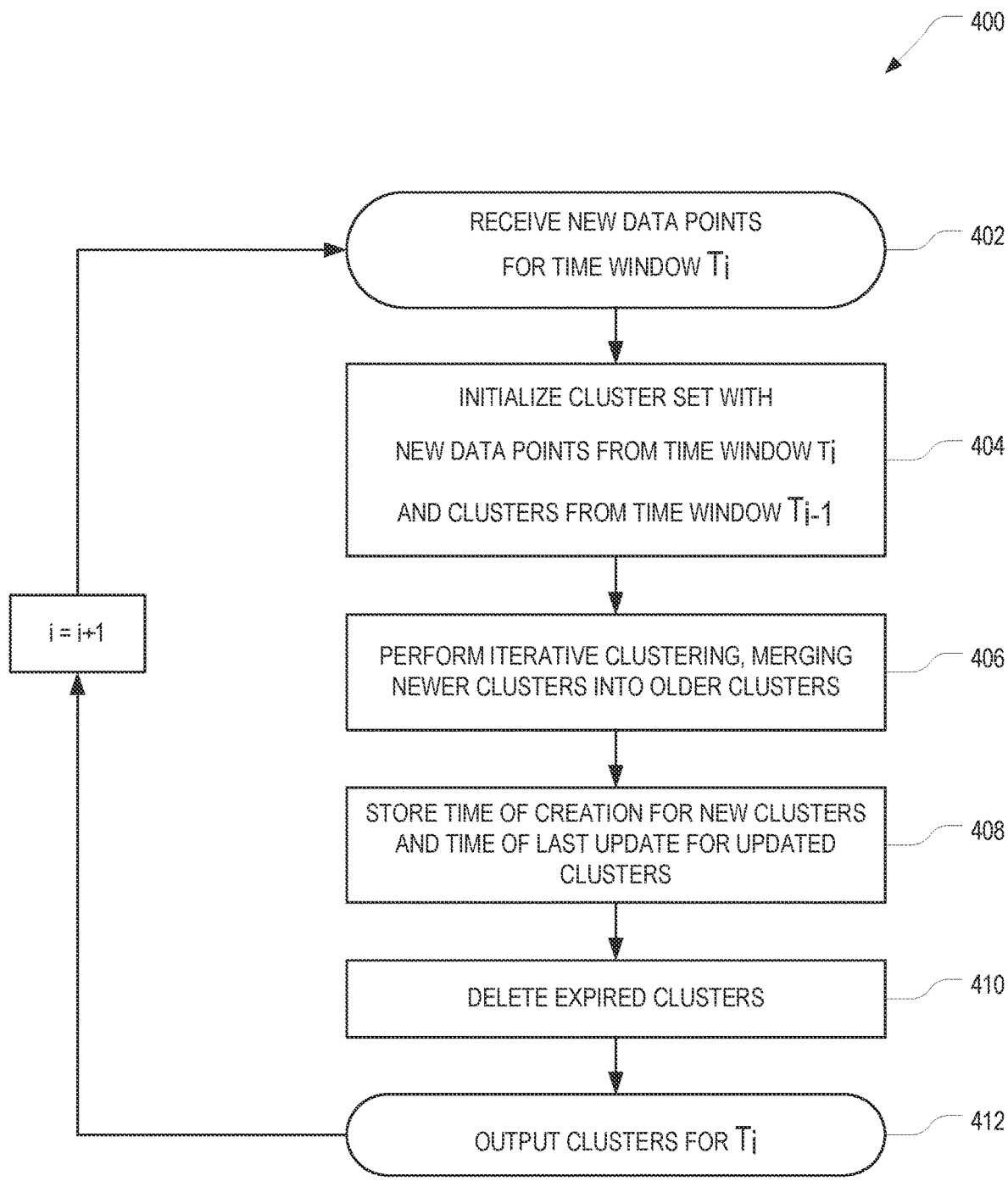
FIG. 4 is a flowchart of an example method for tracking clusters over time, in accordance one or more embodiments.

FIG. 4 is a flowchart of an example method 400 for tracking clusters over time, in accordance with one or more embodiments. The method 400 repetitiously applies the clustering method of FIG. 2, with slight adjustments, to each time window within a sequence of time windows. The clustering for time window $T_i$ begins, in operation 402, with the input of new individual data points received during time window $T_i$. The cluster set $\{C\}_i$ for $T_i$ is initialized, in operation 404, to include both the cluster set $\{C\}_{i-1}$ output by the clustering process for the previous time window $T_{i-1}$ and all the new data points received during $T_i$. Iterative clustering (corresponding to operations 208-218 of method 200) is then performed, in operation 406, to add new data points to the existing clusters and/or form new clusters. Since the addition of the new data points changes the partitioning of the data, it is also possible that, from time to time, previously existing clusters are merged in this process. For each cluster, both the time (window) of creation and the time (window) when the cluster was last updated are tracked as properties in addition to the cluster center and the list of data points the cluster contains. In operation 408, following completion of the clustering (operation 406), the current time (window) is stored as the time of creation for any newly formed cluster, and as the updated time of any previously existing cluster that was updated during $T_i$. The time of creation may be used, in the case of cluster mergers in the clustering in operation 406, to keep the oldest cluster in priority, that is, merge the newer cluster into the older cluster rather than the other way around. The time of last update may be used in operation 410 to remove any clusters that were not updated during a specified rolling window length, which generally spans multiple, and in some cases many, time windows. This manner of letting clusters expire serves to ensure that the cluster set does not grow indefinitely over time. In one example embodiment, the time window is 1 hour, and the rolling window length is 24 hours. The clustering for $T_i$ completes with the output of the updated cluster set in operation 412. The output may be used in subsequent processing steps for $T_i$ (such as, e.g., classification and threat mitigation operations as described with reference to FIG. 1), and also serves as input for generating clusters for the next time window $T_{i+1}$.

The clustering approach described herein addresses various technical problems presented, in particular, by large and/or dynamic sets of categorical data (although the approach can, in principle, also be applied to non-categorical, real-valued data). Unlike many existing clustering processes, which work only with limited amounts of data (examples being hierarchical clustering and DB-scan methods) or pre-define the number of clusters and keep that number generally low (examples being k-means and variants methods), the present approach allows for an arbitrary number of clusters and can be straightforwardly scaled to large datasets. This technical effect is achieved by partitioning the dataset to parallelize clustering. Beneficially, unlike existing processes, the present partitioning scheme does not rely on a Euclidian property of the data space, the technical effect being that the partitioning scheme, and thus the clustering processes described herein, can be applied to data that does not have any Euclidian property, including, in particular, categorical data. In addition, the disclosed clustering approach provide a low-cost way to update clusters based on new incoming data, rendering its continuous deployment for data streams feasible. In summary, the disclosed approach can provide efficiency improvements that save time, and in some instances computational resources, in clustering applications, while also expanding the range of data types and applications amenable to effective automated clustering, as compared with previously existing clustering processes.

Figure 5:
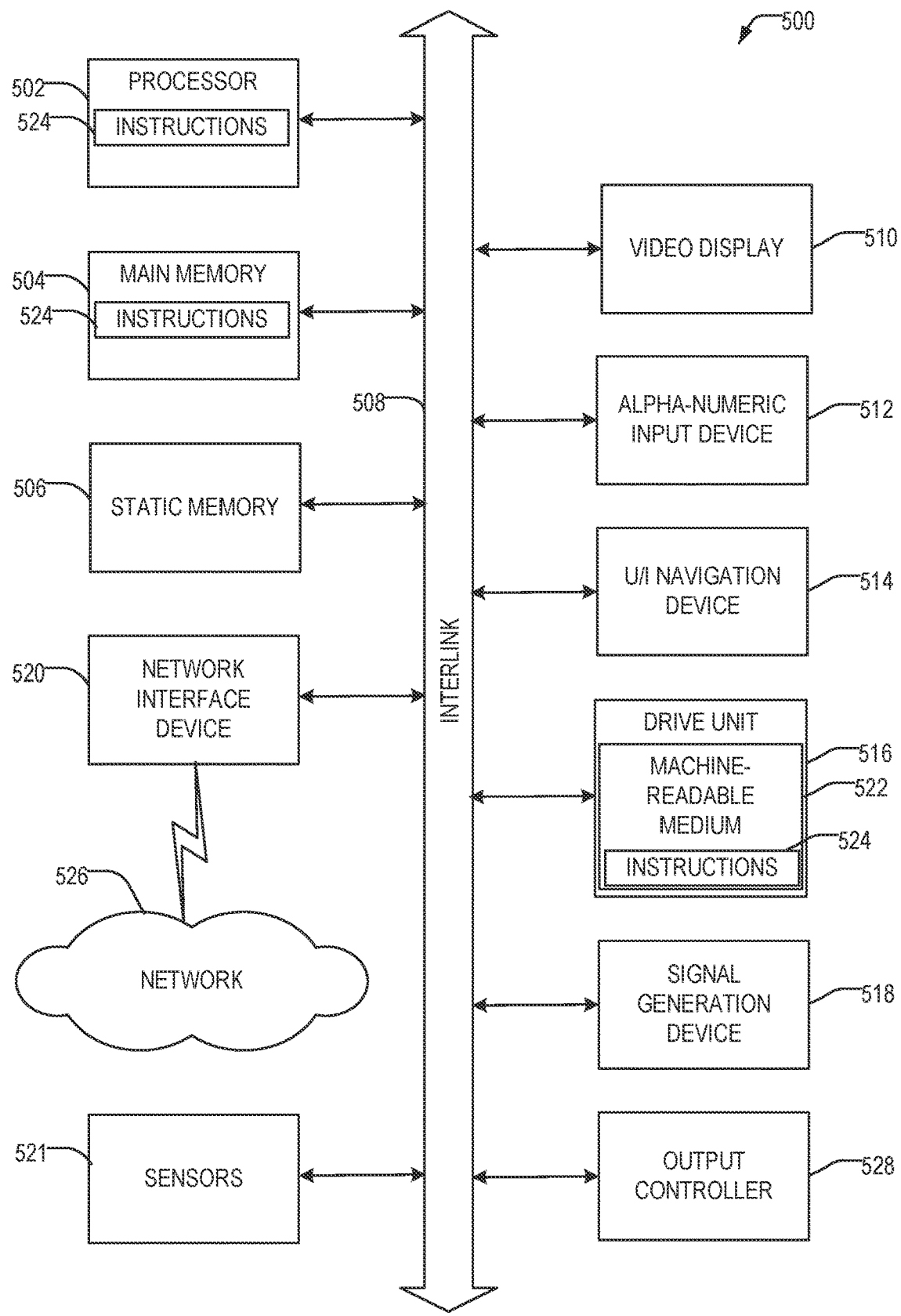
FIG. 5 is a block diagram of an example machine that may perform any one or more of the methods discussed herein.

FIG. 5 is a block diagram of an example machine 500 that may perform any one or more of the methods discussed herein. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 500 may implement the system of FIG. 1 (or parts thereof) and perform one or more of the processes described above with respect to FIGS. 2-4.

Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine-readable medium 522 on which is stored one or more sets of data structures or instructions 524 (e.g, software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices, magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that is not a transitory propagating signal.

The instructions 524 may further be transmitted or received over a communications network 526 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

1. A computer-implemented threat-protection method for processing a plurality of text-based electronic messages, the method comprising: mapping the plurality of text-based electronic messages onto a plurality of data points each represented by a multi-dimensional categorical vector; initializing a cluster set with the plurality of data points: iteratively clustering the plurality of data points in two or more iterations, each iteration comprising: creating an ordering of the plurality of data points based on a permutation of categorical dimensions within the multi-dimensional categorical vectors, partitioning the plurality of data points into at least two blocks based on the ordering, clustering the data points within each of the at least two blocks, and, for each of one or more clusters created as a result of the clustering, replacing, in the cluster set, clustered data points within the cluster by a cluster center associated with the cluster, the cluster center being represented by a multi-dimensional categorical vector, wherein the permutations differ between different iterations; determining a threat associated with a cluster of text-based electronic messages formed during the iterative clustering; and performing a mitigating action based on the determined threat.

2. The method of example 1, wherein the threat comprises at least one of a phishing attempt, a malware attachment, or an unwanted communication.

3. The method of example 1 or example 2, wherein the mitigating action comprises at least one of deleting the text-based electronic messages within the at least one cluster, placing the text-based electronic messages within the at least one cluster in quarantine, warning one or more recipients of the text-based electronic messages within the at least one cluster of the determined threat, launching a security scan for malware, or blocking one or more senders of the text-based electronic messages within the at least one cluster.

4. The method of any of examples 1-3, wherein the clustering is based on a metric defining a pairwise distance between data points, and wherein each of the clusters within each of the at least two blocks comprises all data points within the block whose distances from the associated cluster center are no greater than a specified cluster radius.

5. The method of example 4, wherein the metric is a Hamming distance.

6. The method of example 4 or example 5, wherein the cluster radius is shared among all clusters.

7. The method of example 6, wherein, for each of the clusters, all singleton data points within the cluster are tracked, and wherein, in at least one of the two or more iterations, creating the one or more clusters comprises merging previously created clusters into a new cluster and removing, from the new cluster, all singleton data points from the previously created clusters whose distance from a cluster center of the new cluster exceeds the specified cluster radius.

8. The method of any of examples 1-7, wherein the iterative clustering is performed for a first time window, the method further comprising: repeating the iterative clustering for a second time window, wherein a cluster set for the second time window is initialized with all clusters and singletons from the first time window and data points newly added during the second time window based on text-based electronic messages received during the second time window.

9. The method of example 8, further comprising: repeating the iterative clustering for one or more additional time windows; tracking, for each cluster, when the cluster was last updated; and following the iterative clustering during any of the one or more additional time windows, removing all clusters that were last updated prior to a specified rolling window length spanning one or more time windows.

10. The method of any of examples 1-9, wherein clustering the data points is parallelized across the at least two blocks.

11. The method of any of examples 1-10, wherein the multi-dimensional categorical vectors are sets of hashes computed from text of the plurality of text-based electronic messages.

12. A computer system comprising: at least one computer processor; and at least one computer-readable medium storing instructions which, when executed by the at least one computer processor, cause the at least one computer processor to perform operations for iteratively clustering a plurality of data points, the operations comprising, in each of at least two iterations: creating an ordering of the plurality of data points; partitioning the plurality of data points into at least two blocks based on the ordering; clustering the data points within each of the at least two blocks; and, for each of one or more clusters created as a result of the clustering, replacing clustered data points within the cluster by a cluster center associated with the cluster, wherein the orderings differ between different iterations.

13. The system of example 12, wherein the operations further comprise performing an automated action on at least one cluster formed during the iterative clustering.

14. The system of example 13, wherein the automated action comprises at least one of a mitigating action responsive to a threat classification, an enforcement action responsive to detection of infringement, application of a document policy responsive to a document classification, cluster storage in association with a topic, or cluster assignment to a manager.

15. The system of any of examples 12-14, wherein the data points are represented by multi-dimensional vectors, and wherein, for each iteration following a first iteration, creating the ordering comprises permuting dimensions within the multi-dimensional vectors.

16. The system of example 15, wherein elements of the multi-dimensional vectors have categorical values.

17. The system of example 15 or example 16, wherein the multi-dimensional vectors are sets of hashes computed from text or image input.

18. The system of any of examples 12-17, the operations comprising performing the iterative ordering, partitioning, clustering, and replacing for each of multiple successive time windows to track clusters of an evolving set of data points over time, wherein, for each time window, the plurality of data points is initialized with all data points newly added during the time window and all clusters and singleton data points from an immediately preceding time window.

19. A non-transitory machine-readable medium storing instructions which, when executed by at least one computer processor, cause the at least one computer processor to perform operations for iteratively clustering a plurality of data points, the operations comprising, in each of at least two iterations: creating an ordering of the plurality of data points; partitioning the plurality of data points into at least two blocks based on the ordering; clustering the data points within each of the at least two blocks; and, for each of one or more clusters created during the clustering, replacing clustered data points within the cluster by a cluster center associated with the cluster, wherein the orderings differ between different iterations.

20. The machine-readable medium of example 19, further storing instructions which, when executed by the at least one computer processor, cause the at least one computer processor to perform an automated action on at least one cluster formed in the iterative clustering.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A computer-implemented method for processing data items, the method comprising:
    representing the data items as initial data points represented by vectors comprising respective ordered sets of vector elements;
    initializing a cluster set of data points with the initial data points, the data points in the cluster set representing cluster centers and the initial data points serving as initial cluster centers of singleton clusters;
    iteratively updating the cluster set of data points in a loop comprising two or more iterations, utilizing respective permutations of the vector elements within the vectors, the permutations differing between different iterations, the iterations comprising:
        creating an ordering of the data points in the cluster set based on the respective permutation of the vector elements within the vectors,
        partitioning the data points in the cluster set into at least two blocks based on the ordering,
        separately clustering the data points within the at least two blocks to create new clusters of individual data points,
        determining, from the individual data points within the new clusters, respective new cluster centers, and,
        creating an updated cluster set of data points by replacing the individual data points within the clusters by the respective new cluster centers, the new cluster centers being represented by respective vectors;
    upon exiting the loop, outputting one or more final clusters of the data items based on the updated cluster set of data points; and
    for at least one of the one or more final clusters, performing a common action on the data items within the final cluster.

2. The method of claim 1, wherein the data items are documents.

3. The method of claim 2, wherein the common action comprises applying a common document policy to the documents within the final cluster.

4. The method of claim 1, wherein the data items are images.

5. The method of claim 4, wherein the common action comprises a copyright enforcement action.

6. The method of claim 1, wherein the data items correspond to customers.

7. The method of claim 6, wherein the common action comprises assignment of the customers within the final cluster to a common customer relationship manager.

8. The method of claim 1, further comprising determining a threat associated with the at least one of the one or more final clusters, wherein the common action comprises a threat-mitigating action.

9. The method of claim 1, wherein the clustering is based on a metric defining a pairwise distance between data points, and wherein the new clusters within the at least two blocks comprise individual data points within the respective blocks whose distances from the respective new cluster centers determined for the new clusters are no greater than a specified cluster radius.

10. The method of claim 1, wherein the vectors are categorical vectors.

11. The method of claim 10, wherein the categorical vectors are sets of hashes computed from the data items.

12. The method of claim 1, wherein the vectors are fixed-length vectors.

13. The method of claim 1, wherein the data items comprise real-valued data.

14. A computer system for processing categorical data items, the system comprising:
- at least one hardware computer processor; and
- at least one computer-readable medium storing instructions which, when executed by the at least one computer processor, cause the at least one hardware computer processor to perform operations comprising:
  - representing the data items as initial data points represented by categorical vectors comprising respective ordered sets of vector elements;
  - initializing a cluster set of data points with the initial data points, the data points in the cluster set representing cluster centers and the initial data points serving as initial cluster centers of singleton clusters;
  - iteratively updating the cluster set of data points in a loop comprising two or more iterations, utilizing respective permutations of the vector elements within the vectors, the permutations differing between different iterations, the iterations comprising:
    - creating an ordering of the data points in the cluster set based on the respective permutation of the vector elements within the vectors,
    - partitioning the data points in the cluster set into at least two blocks based on the ordering,
    - separately clustering the data points within the at least two blocks to create new clusters of individual data points,
    - determining, from the individual data points within the new clusters, respective new cluster centers, and,
    - creating an updated cluster set of data points by replacing the individual data points within the clusters by the respective new cluster centers, the new cluster centers being represented by respective vectors;
  - upon exiting the loop, outputting one or more final clusters of the data items based on the updated cluster set of data points; and
  - for at least one of the one or more final clusters, performing a common action on the data items within the final cluster.

15. The system of claim 14, wherein the iterative ordering, partitioning, clustering, determining, and replacing are performed for first and second successive time windows to track clusters of an evolving set of data points over time, and wherein, for the second time window, the cluster set of data points is initialized with data points newly added during the second time window and clusters and singleton data points from the first time window.

16. The system of claim 14, wherein the categorical data items comprise text or images and the categorical vectors are sets of hashes computed from the text or images.

17. The system of claim 14, wherein the categorical data items comprise documents and the common action comprises applying a common document policy to the documents within the final cluster.

18. The system of claim 14, wherein the categorical data items comprise images, and common action comprises a copyright enforcement action.

19. The system of claim 14, wherein the operations further comprise determining a threat associated with the at least one of the one or more final clusters, wherein the common action comprises a threat-mitigating action.

20. A non-transitory machine-readable medium storing instructions which, when executed by at least one computer processor, cause the at least one computer processor to perform operations for processing data items, the operations comprising:
- representing the data items as initial data points represented by fixed-length categorical vectors comprising respective ordered sets of vector elements;
- initializing a cluster set of data points with the initial data points, the data points in the cluster set representing cluster centers and the initial data points serving as initial cluster centers of singleton clusters;
- iteratively updating the cluster set of data points in a loop comprising two or more iterations, utilizing respective permutations of the vector elements within the vectors, the permutations differing between different iterations, the iterations comprising:
  - creating an ordering of the data points in the cluster set based on the respective permutation of the vector elements within the vectors,
  - partitioning the data points in the cluster set into at least two blocks based on the ordering,
  - separately clustering the data points within the at least two blocks to create new clusters of individual data points,
  - determining, from the individual data points within the new clusters, respective new cluster centers, and,
  - creating an updated cluster set of data points by replacing the individual data points within the clusters by the respective new cluster centers, the new cluster centers being represented by respective vectors;
- upon exiting the loop, outputting one or more final clusters of the data items based on the updated cluster set of data points; and
- for at least one of the one or more final clusters, performing a common action on the data items within the final cluster.

* * * * *